United States Patent Office 3,359,297
Patented Dec. 19, 1967

3,359,297
PROCESS FOR THE PREPARATION OF SULFONIC ACIDS HAVING DITHIOCARBAMIC ACID ESTER AND THIOUREA OR THIOSEMICARBAZIDE GROUPS
Wolfgang Gündel, Dusseldorf-Oberkassel, Germany, assignor to Dehydag Deutsche Hydrierwerke G.m.b.H., Dusseldorf-Holthausen, Germany, a corporation of Germany
No Drawing. Filed Apr. 1, 1965, Ser. No. 444,784
Claims priority, application Germany, Apr. 18, 1964,
D 44,199
4 Claims. (Cl. 260—455)

ABSTRACT OF THE DISCLOSURE

An improved process for the preparation of compounds which contain at least one

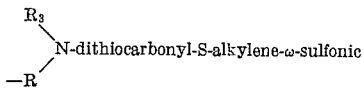

acid group where $R_3$ is a hydrocarbon radical and R is alkylene of 2 to 18 carbon atoms having attached thereto at least one thiourea or thiosemicarbazide grouping.

Prior art

In my U.S. Patent No. 3,122,549, there is described a process for the preparation of the said compounds which comprises reacting in an aqueous solution a polyamine having 2 to 3 nitrogen atoms and at least one primary amino and one secondary amino groups with one mole of alkali and one mole of carbon disulfide per mole of amino nitrogen to form the corresponding polydithiocarbamate salt, reacting the latter with a member selected from the group consisting of salts of a halo alkane sulfonic acid having 2 to 4 carbon atoms and 1,3-alkane sultones and 1,4-alkane sultones having 3 to 4 carbon atoms to form the corresponding alkane polydithiocarbamyl - S - alkylene-ω-sulfonic acid salt and reacting the latter with an amine or hydrazine under alkaline conditions to form the said organic sulfonic acid.

The process is quite advantageous since all the process steps are carried out in an aqueous solvent and subsequent steps can be carried out without isolating the intermediate products. However, the recovery of the final products by crystallization from the reaction medium or precipitation by the addition of a salt solution and filtration is complicated by oily by-products. The oily by-products are formed by the required prolonged contact of the sulfonic acid salt with the alkaline solution in the last reaction step and are detrimental to the recovery, purity and percent yield of the final products.

Objects of the invention

It is an object of the invention to provide an improved process for the preparation of compounds containing at least one

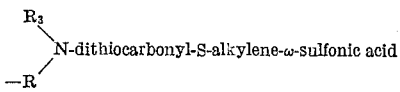

grouping and at least one thiourea or thiosemicarbazide grouping attached through the R alkylene radical to the dithiocarbonyl group in high yields.

These and other objects and advantages of the invention will become obvious from the following detailed description.

The invention

The novel process of the invention comprises reacting a polyamine lacking tertiary amino groups having the formula

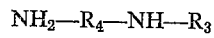

wherein $R_3$ is an organic radical of the above definition and $R_4$ is an alkylene radical having 2 to 18 carbon atoms in an aqueous medium with one mole of carbon disulfide and one mole of an alkali for each mole of amino groups to form a poly-dithiocarbamate having the formula

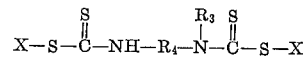

wherein $R_3$ and $R_4$ have the above definitions and X is a metal, reacting the said poly-dithiocarbamate with a member of the group consisting of a salt of a haloalkane-ω-sulfonic acid having 2 to 4 carbon atoms and a 1,3-alkane sultone and a 1,4-alkane sultone having up to 4 carbon atoms to form alkane poly-dithiocarbamyl-S-alkylene sulfonic acid salts having the formula

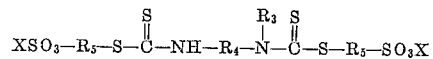

wherein $R_4$, $R_3$ and X have the above definitions and $R_5$ is an alkylene radical having 2 to 4 carbon atoms, reacting the latter under alkaline conditions with one mole of a nitrogen compound selected from the group consisting of ammonia, a hydrazine having at least one labile hydrogen atom, a primary amine and a secondary amine for each mole of amino groups present in the original polyamine in the presence of about stoichiometric amounts of an organo halogen to form a compound of the formula

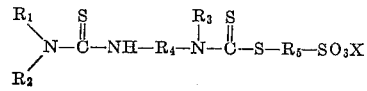

wherein $R_3$, $R_4$, $R_5$ and X have the above definitions and $R_1$ and $R_2$ are the residue of the nitrogen compound and recovering the latter.

The organo halogen compounds rapidly react with the mercapto groups formed by the alkaline splitting of the mercapto alkane sulfonic acid radicals to form thio ethers and remove the alkali which is no longer needed from the reaction mixture and which interferes with the reaction. This eliminates the oily by-products and increases the yield and purity of the desired final products.

Suitable organo halogen compounds are chlorides, bromides and iodides of compounds whose halogen atoms are labile due to the presence of activating groups in the compound and which are preferably water-soluble since the reaction is effected in an aqueous solution. Examples of suitable compounds are lower alkyl chlorohydrins such as ethylene chlorohydrin, glycerine-α-chlorohydrin, glycerine-α,γ-dichlorohydrin, etc., halo lower alkane sulfonic acids such as chloroethane sulfonic acid, chloropropane sulfonic acid, bromopropane sulfonic acid, etc., alkali metal salts of α-halo carboxylic acids, particularly α-chloro lower aliphatic carboxylic acids such as α-chloro acetic acid, etc. Alkali metal salts of α-chloro-acetic acid is preferred because of its low cost and more favorable yields.

The improved yields of the process were unexpected since the halogen compounds might be reacted with the thiourea groups of the desired final products to form thiouronium salts which would further reduce the yields. This reaction, however, only occurs to a very minor degree.

The polyamines which may be used as starting materials for the novel process may be aliphatic, cycloaliphatic and araliphatic amines. Examples of suitable amines are N-ethyl-ethylene-diamine-1,2, N-methyl-propylene - diamine-1,3, N-benzyl-propylene-diamine-1,3, N-cyclohexyl - butylene - diamine - 1,4, N-tetrahydrofurfuryl-hexamethylene-diamine-1,6, N-methyl-dodecamethylene-diamine-1,12, N-ethyl-octadecylmethylene - diamine - 1,18, diethylene triamine, N-methyldiethylene-triamine, N'-benzyl-dipropylene-triamine, triethylene-tetramine, tripropylene-tetramine, higher polyethylene polyamines, etc.

The reaction of the polyamine with carbon disulfide and the alkali is usually performed in water but in exceptional cases the concurrent use of water-miscible organic solvent such as a lower alkanol may be advantageous. The reaction is preferably effected by stirring the aqueous reaction medium at temperatures below 50° C. until all the carbon disulfide has reacted and the reaction mixture has become clear. The alkali is preferably an alkali metal hydroxide such as sodium hydroxide.

Examples of suitable alkali metal salts of haloalkane sulfonate which may be used in the second step of the reaction are bromoethane sodium sulfonate, bromopropane sodium sulfonate, bromobutane sodium sulfonate, etc. However, the use of sultones or the inner acid hydrides of 1,3- and 1,4-hydroxy alkane sulfonic acids such as 1,3-propane sultone and 1,4-butane sultone are the preferred reactants for the second step since they react so rapidly with the poly-dithiocarbamates to form the esters that the alkalinity of the unreacted dithiocarbamate groups does not cleave the esters formed. When the latter reaction is performed in an aqueous medium, heat is liberated and practically no side reaction products are formed.

The third step of the process is effected by reacting nitrogen containing compound with the product formed in the second step under alkaline conditions. An alkaline compound such as an alkali metal hydroxide may be used or an excess of the nitrogen containing compound. The reaction can be effected at room temperatures, but if desired, temperatures up to 50° C. may be used.

The primary and secondary amines used in the third step of the process may be aliphatic, cycloaliphatic, araliphatic or heterocyclic, and may be mono or polyamines and the hydrazines may be aliphatic, cycloaliphatic, araliphatic, aromatic, or heterocyclic in nature which contain a labile hydrogen atom. If the said amines are polyamines, the amines will react with more than one molecule of the product formed in the second step of the process.

Examples of suitable amines which may be used in the third step of the process are aliphatic amines such as methylamine, ethylamine, butylamine, dodecylamine, octadecylamine, diethylamine, dibutylamine, ethylene-diamine-1,2, propylene-diamine-1,2, hexamethylene-diamine-1,6, octadecamethylene - diamine - 1,18, N-methylethylene-diamine-1,2, N-butyl-propylene-diamine-1,3, N-ethyl-hexamethylene-diamine-1,6, N,N'-diethyl-ethylene-diamine-1,2, diethylene-triamine, triethylene-tetramine, etc.; cycloaliphatic amines such as cyclohexylamine and cyclohexyl-diamine-1,4; araliphatic amines such as benzylamine, ethylbenzylamine, dibenzylamine, N-benzyl-ethylene-diamine-1,4, etc.; and heterocyclic amines such as tetrahydrofurfurylamine, piperidine, morpholine, butyl-tetrahydrofurfurylamine, piperazine, etc.

Examples of suitable hydrazines containing at least one liable hydrogen atom are hydrazine; aliphatic hydrazines such as N-ethyl-hydrazine, N,N-diethyl-hydrazine, etc.; cycloaliphatic amines such as N-cyclohexyl-hydrazines; araliphatic hydrazines such as N-benzyl-hydrazine, N,N-dibenzyl-hydrazine, N,N',N'-tribenzyl-hydrazine; aromatic hydrazines such as phenyl - hydrazine, tolyl - hydrazine, N,N - diphenyl-hydrazine, N-phenyl-N'-benzyl-hydrazine, N-phenyl-N,N'-dibenzyl-hydrazine, etc.; and heterocyclic amines such as N-amino-piperidine, N-amino-morpholine, etc.

The compounds produced by the process of the invention in their simplest form have a formula selected from the group consisting of

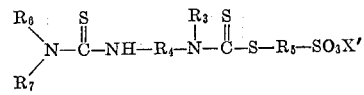

and

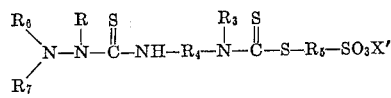

wherein X' is selected from the group consisting of hydrogen, an alkali metal and a salt forming organic base, R, $R_6$ and $R_7$ are selected from the group consisting of hydrogen, aliphatic, cycloaliphatic, araliphatic and aromatic radicals and $R_6$ and $R_7$ when taken with the nitrogen atom form a heterocyclic radical, $R_3$ is selected from the group consisting of aliphatic, cycloaliphatic araliphatic radicals, $R_4$ is an alkylene radical having 2 to 18 carbon atoms and $R_5$ is an alkylene radical having 2 to 4 carbon atoms. In the more complex forms of the invention, at least one of the radicals $R_6$, $R_7$ and $R_3$ contains an additional grouping selected from the group consisting of thiourea, thiosemicarbazide and dithiocarbonyl - S - alkylene-ω-sulfonic acid groups. The terms aliphatic, cycloaliphatic and araliphatic are intended to include radicals containing hetero atoms or hetero atom groups.

In the following example there is disclosed a preferred embodiment to illustrate the invention. However, it should be understood that the invention is not intended to be limited to the specific embodiments.

*Example.—Preparation of N,N''-di-(benzylthiocarbamyl) - diethylene - triamino-N'-dithiocarbonyl-S-propane-ω-sodium sulfonate*

10.3 parts by weight (0.1 mole) of diethylene- triamine were added with vigorous stirring to a mixture of 22.8 parts by weight (0.3 mole) of carbon disulfide and 40 parts by volume of water. After about 1 hour, 60 parts by volume (0.3 mole) of 5 N sodium hydroxide was added thereto and the mixture was stirred at room temperature until all the carbon disulfide had reacted and a clear reddish-colored solution had formed. 36.6 parts by weight (0.3 mole) of molten 1,3-propane sultone were stirred into this solution whereby the temperature rose to 50° C. at which temperature it was held for 2 hours. After cooling, the mixture was admixed with a solution of 23.3 parts by weight (0.2 mole) of sodium α-chloroacetate in 200 parts by weight of a 7.5% sodium chloride solution. Then, 21.4 parts by weight (0.2 mole) of benzylamine was added thereto followed by dropwise addition of 40 parts by volume (0.2 mole) of 5 N sodium hydroxide. The mixture was stirred for 1 to 2 hours during which N,N'' - di(benzylthiocarbamyl) - diethylene-triamino-N'-dithiocarbonyl-S-propane-ω-sodium sulfonate precipitated in easily filterable form. The precipitate was suction filtered and was recrystallized from a mixture of 500 parts by volume of ethanol and 40 parts by volume of water after being distilled to remove any dibenzylurea formed to obtain 29–30 parts by weight (46–48% of theory) of the pure product in the form of colorless crystals. The product was very soluble in hot water and upon addition of a copper salt solution to an aqueous solution of the product, a difficultly-soluble complex salt was obtained which was useful in copper electroplating baths because of their leveling and brightening properties.

The said process was repeated except the sodium chloroacetate was omitted and the yield was only 24 to 26% of theory.

Similarly, increased yields were obtained in the preparation of

N-benzyl-thiocarbamyl-propylene-diamino-1,3-N'-methyl-N'-dithiocarbonyl-S-propane-ω-sodium sulfonate, N-cyclohexylthiocarbamyl-propylene-diamino-1,3-N'-methyl-N'-dithiocarbonyl-S-propane-ω-sodium sulfonate,
N'',N''-(piperazino-N,N'-dithiocarbonyl)-bis-propylene-diamino-1,3-N'''-methyl-N'''-dithiocarbonyl-S-propane-ω-sodium sulfonate,
N-phenylthiocarbazinyl-propylene-diamino-1,3-N'-methyl-N'-dithiocarbonyl-S-propane-ω-sodium sulfonate,
N-benzyl-thiocarbamyl-propylene-diamino-1,3-N'-methyl-N'-dithiocarbonyl-S-ethane-ω-sodium sulfonate,
N-pentamethylene-thiocarbamyl-ethylene-diamino-1,2-N'-benzyl-N'-dithiocarbonyl-S-butane-ω-sodium sulfonate,
N-phenyl-thiocarbamyl-dodecylene-diamino-1,12-N'-ethyl-N'-dithiocarbonyl-S-1'-methylpropane-3'-sodium sulfonate, etc.

Various modifications of the process of the invention may be made without departing from the spirit or scope thereof and it is to be understood that the invention is to be limited only as defined in the appended claims.

I claim:
1. A process for the preparation of compounds containing at least one

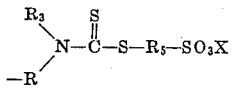

grouping wherein R is an alkylene radical of 2 to 18 carbon atoms having attached thereto at least one group selected from the group consisting of thiourea and thiosemicarbazide groupings, $R_3$ is selected from the group consisting of lower alkyl, benzyl and cyclohexyl, $R_5$ is an alkylene of 2 to 4 carbon atoms and X is in alkali metal which comprises reacting an alkylene polyamine having 2 to 4 nitrogen atoms and lacking tertiary amino groups and contains a nitrogen substituent selected from the group consisting of lower alkyl, benzyl and cyclohexyl, said alkylene having 2 to 18 carbon atoms, in an aqueous medium with one mole of carbon disulfide and one mole of an alkali metal for each mole of amino groups to form a poly-dithiocarbamate having a group of the formula

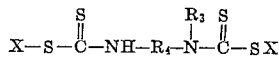

wherein $R_4$ is an alkylene of 2 to 18 carbon atoms and $R_3$ and X have the above definition, reacting the latter with a member selected from the group consisting of a salt of a halo alkane-ω-sulfonic acid having 2 to 4 carbon atoms, a 1,3-alkane sultone having up to 4 carbon atoms and a 1,4-alkane sultone having up to 4 carbon atoms to form alkane poly-dithiocarbamyl-S-alkylene sulfonic acid salts having a group of the formula

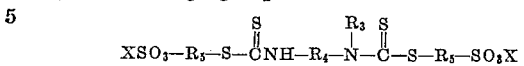

wherein $R_3$, $R_4$, $R_5$ and X have the above definitions, reacting the latter under alkaline conditions with one mole of a nitrogen compound selected from the group consisting of ammonia, a hydrazine having at least one labile hydrogen atom, a primary amine and a secondary amine for each mole of amino groups present in the original polyamine in the presence of about stoichiometric amounts of a water-soluble, aliphatic halogen compound whose halogen is labile to form a compound having a group of the formula

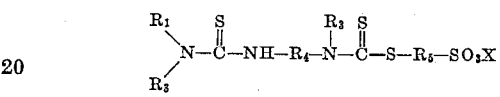

wherein $R_3$, $R_4$, $R_5$ and X have the above definition and $R_1$ and $R_2$ are the residue of the nitrogen compound and recovering the latter.

2. The process of claim 1 wherein the organo halogen compound is an alkali metal salt of an α-chloro lower aliphatic carboxylic acid.

3. The process of claim 1 wherein the organo halogen compound is sodium α-chloroacetate.

4. A process for the preparation of N,N''-di-(benzyl-triocarbamyl) - diethylene - triamino-N'-dithiocarbonyl-S-propane-ω-sodium sulfonate which comprises reacting diethylene triamine in an aqueous media with 3 moles of carbon disulfide and 3 moles of sodium hydroxide, reacting the resulting reaction product with 1,3-propane sultone and reacting the resulting reaction product with benzyl amine under alkaline conditions in the presence of sodium α-chloroacetate to form N,N''-di-(benzylthiocarbamyl)-diethylene - triamino - N'-dithiocarbonyl-S-propane-ω-sodium sulfonate and recovering the latter.

References Cited

UNITED STATES PATENTS 3,122,549  2/1964  Grundel _____ 260—455 X

CHARLES B. PARKER, *Primary Examiner.*

BERNARD BILLIAN, *Assistant Examiner.*